US005568671A

United States Patent [19]
Harris et al.

[11] Patent Number: 5,568,671
[45] Date of Patent: Oct. 29, 1996

[54] CASTER ASSEMBLY WITH INTEGRAL PLASTIC STEM AND HORN AND WITH REMOVABLE AXLE LOCK CAP

[75] Inventors: Charles A. Harris; Robert J. Simonsen, both of Evansville, Ind.

[73] Assignee: FKI, Industries, Inc., Fairfield, Conn.

[21] Appl. No.: 419,368

[22] Filed: Apr. 10, 1995

Related U.S. Application Data

[63] Continuation-in-part of Ser. No. 347,902, Dec. 1, 1994.
[51] Int. Cl.$^6$ .................................................. B60B 33/00
[52] U.S. Cl. .................................. 16/18 R; 16/20; 16/37; 16/47
[58] Field of Search ................................. 16/18 R, 20, 37, 16/47, 21, 31 R, 381, 386, 38

[56] References Cited

U.S. PATENT DOCUMENTS

| | | |
|---|---|---|
| D. 212,935 | 12/1968 | Appel . |
| 2,659,100 | 11/1953 | Cramer . |
| 3,210,795 | 10/1965 | Fontana et al. . |
| 3,718,942 | 3/1973 | Arenson ..................................... 16/37 |
| 3,818,541 | 6/1974 | Daniels . |
| 3,828,392 | 8/1974 | Bolger . |
| 3,869,105 | 3/1975 | Daniels . |
| 3,964,124 | 6/1976 | Crawford . |
| 4,120,071 | 10/1978 | Crescenzi ................................... 16/37 |
| 4,192,408 | 3/1980 | Walker . |
| 4,404,707 | 9/1983 | Walker . |
| 4,459,920 | 7/1984 | Cwik . |
| 4,689,848 | 9/1987 | Kotzin . |
| 4,719,664 | 1/1988 | Berfield ..................................... 16/47 |
| 4,720,894 | 1/1988 | Deasy et al. ............................... 16/37 |
| 5,136,751 | 8/1992 | Coyne et al. . |
| 5,199,131 | 4/1993 | Harris ....................................... 16/20 |

Primary Examiner—W. Donald Bray
Attorney, Agent, or Firm—Woodard, Emhardt, Naughton Moriarty & McNett

[57] ABSTRACT

An all-plastic, swivel caster assembly has horn and stem molded as a homogeneous unit of plastic. A wheel of molded plastic or plastic-rubber combination, supports the assembly. In one version, the horn sidewalls have fingers forming keyhole-shaped slots receiving grooved end portions of a plastic axle borne by the wheel. The axle retaining fingers normally secure the axle in the horn, but are sufficiently resilient to enable intentional removal of the wheel and axle assembly from the horn without tools, for cleaning. In another version, the horn sidewalls have apertures receiving a plastic axle which has a head on one end and a circumferential groove at the other end. An axle cap located at the outside face of one horn sidewall has a slot received on the axle groove, and retains the axle in assembly. The cap has a detent boss received in a detent recess in the horn sidewall to keep the cap, and thereby the axle, in place. In both versions of the assembly, a caster stem retainer of molded plastic, for mounting in a cart or the like, rotatably receives the caster stem and is supported on the upper end of the caster stem by a bearing ball which supports the retainer, and thereby the cart or other device. The stem retainer has a base portion with a skirt thereon covering a platform portion at the top of the caster horn for excluding dirt and moisture.

27 Claims, 7 Drawing Sheets

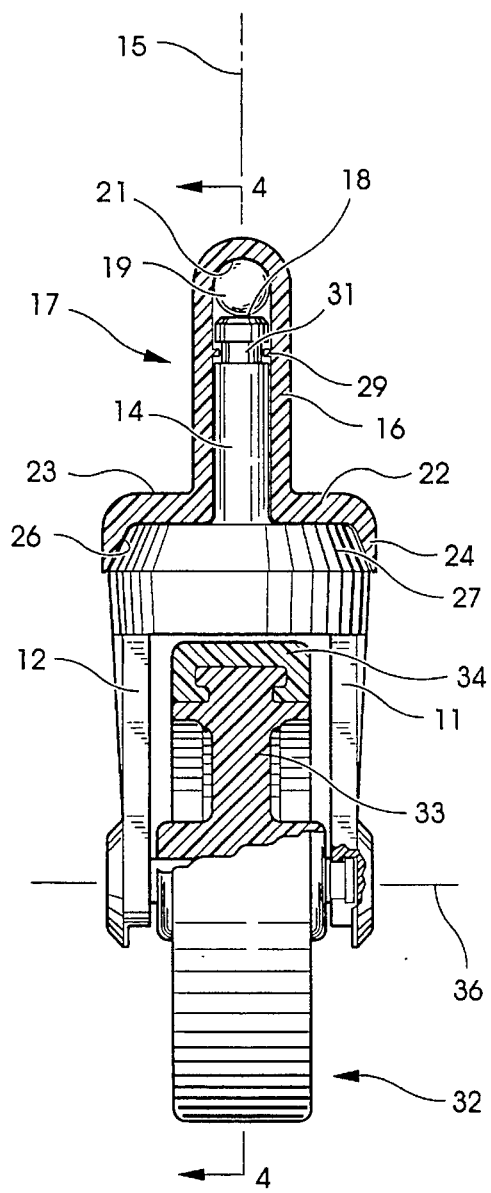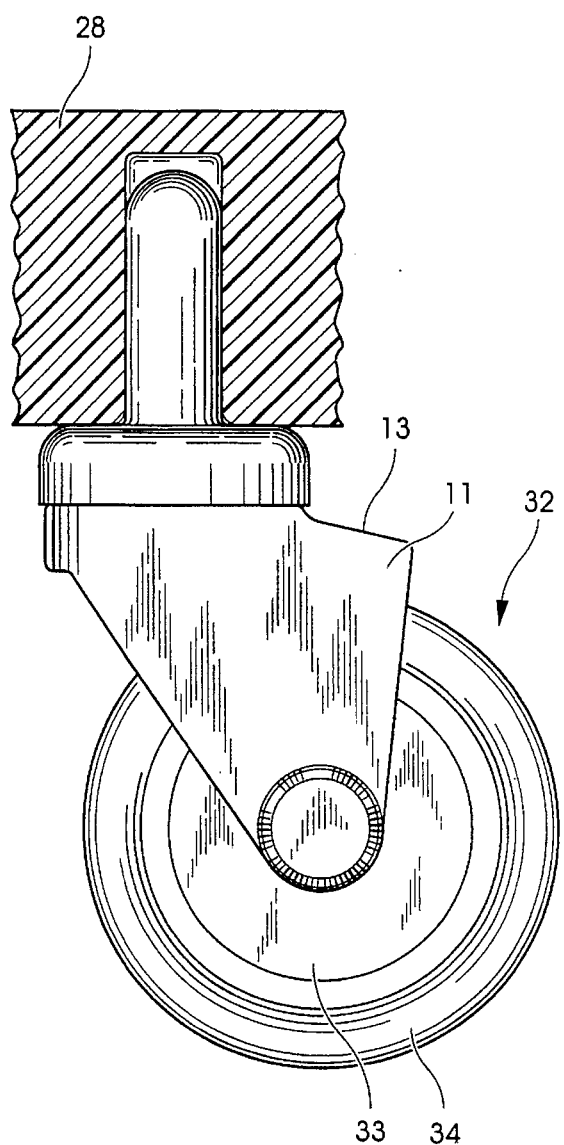
Fig. 2
Fig. 3

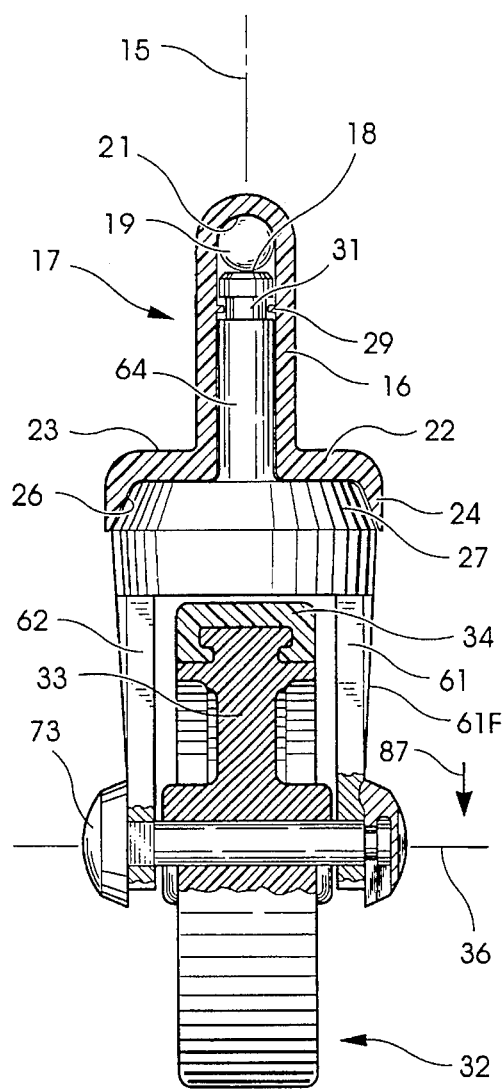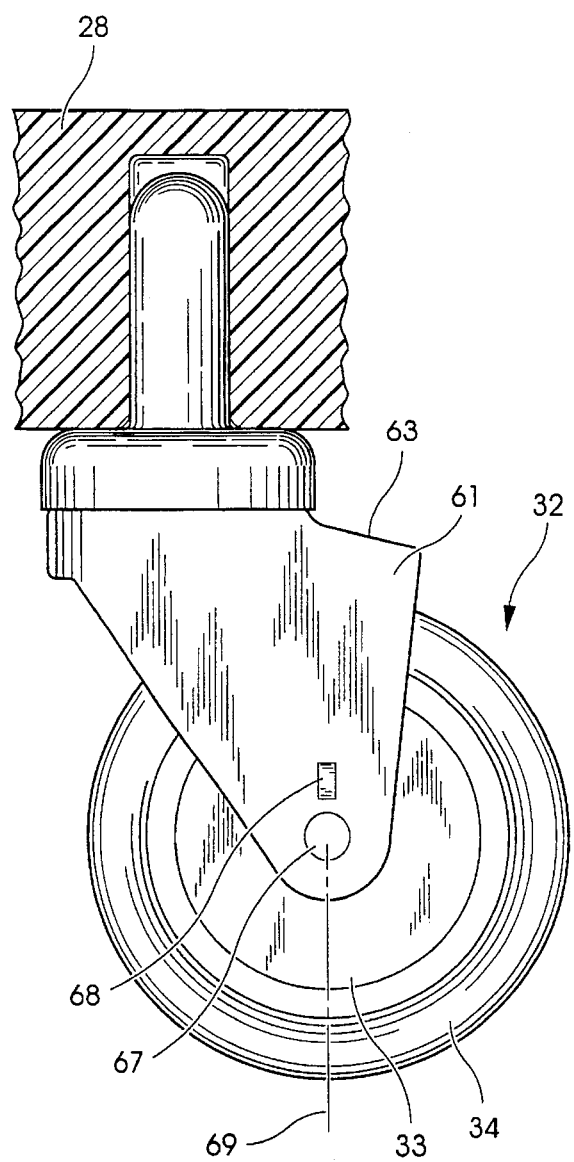
Fig. 9
Fig. 10

5,568,671

1

CASTER ASSEMBLY WITH INTEGRAL PLASTIC STEM AND HORN AND WITH REMOVABLE AXLE LOCK CAP

BACKGROUND OF THE INVENTION

This patent application is a continuation-in-part of pending patent application Ser. No. 08/347,902, filed Dec. 1, 1994, entitled "Caster Assembly With Integral Plastic Stem and Horn".

1. Field of the Invention

This invention relates generally to casters, and more particularly to an inexpensive caster assembly particularly adapted to dirty and damp environments.

2. Description of the Prior Art

There are many applications of casters in which the caster is subject to dirt and moisture. While some large casters can tolerate such conditions for awhile, others cannot do so. This is particularly true for smaller casters. For example, mop buckets or mop bucket carts are often used in areas where the floor has not been swept before it is mopped. In addition, the mopping solution is typically water-based. The result is that the casters get wet, dirty and, if made of metal or mounted by rivets or the like, will inevitably get rusty. Also, they are likely to get dirty and may accumulate mop strings wrapped around the wheel or axle and binding the caster. If a caster incorporating steel components gets wet and is left unattended, eventually there will be rust of the steel components themselves with attendant deterioration of performance and/or staining of the caster components and possible rust staining of the floor on which the cart is sitting, or rust transfer from the wheel to the floor on which the cart is used.

A U.S. Pat. No. 3,818,541 was issued Jun. 25, 1974 to Daniels and discloses a caster assembly which comprises a hollow shell 11 of molded plastic and having a wheel made of two pieces (FIGS. 1–7) or as a unitary member shown in FIG. 8. In either case, the roller is received on an axle shaft 12 with grooves adjacent its ends received in T-section sockets in the shell, with the shafts serving as a reinforcement for the shell, tying the sidewalls 14 and 15 together. A pin comprising a "spigot" and bearing flange 43 is rotatably received in the front of the shell. Alternatively, a spigot can be permanently and non-rotatably secured to the boss 19 of the shell and rotatably mounted in a fitting on the end of the furniture leg. A caster having some similar features is shown and described in U.S. Pat. No. 3,869,105 issued Mar. 4, 1975 to Daniels. While U.S Pat. No. 3,818,541 states that "... a close fit between the shaft and roller and between the end faces of the roller and the insides faces of the shell substantially reduce risk of hairs or similar strands from becoming wrapped around the ends of the shaft and interfering with the running of the roller.", the deterioration of the metal parts which can occur in a moist environment, and the tendency of dirt to collect and be carried along on wet surfaces such as the tread and sides of the wheels, indicate that these caster assemblies would not be suitable for use on equipment such as mop buckets, for example. The present invention is addressed to the particular problems associated with conventional casters in unfavorable environments.

SUMMARY OF THE INVENTION

Described briefly, according to one embodiment of the present invention, a caster assembly includes a homogeneous unit of plastic material comprising the caster horn and stem. The horn has spaced sidewalls with keyhole shaped slots to receive circumferential grooves adjacent the ends of a plastic axle which receives a one-piece molded plastic wheel or combination plastic and elastomeric wheel. The axle retainers in the horn, while normally securing the axle in the horn, are sufficiently resilient to enable removal of the wheel and axle assembly from the horn without the use of tools, for cleaning. A caster stem retainer for mounting in a cart or the like to be supported by the caster assembly, rotatably receives the caster stem and is supported on the upper end of the caster stem by a bearing ball which supports the retainer, and thereby the cart or other device. The stem retainer has a base portion with a skirt thereon covering a platform portion of the top of the caster horn for excluding dirt and moisture. In another embodiment, the sidewalls of the horn do not have the axle receiving slots but, instead, have axle receiving apertures therein. The plastic axle has a head on one end and a circumferential groove at the other end. An axle retaining cap is received on the grooved end outboard of the horn sidewall, and the cap has a detent cooperable with the horn sidewall to prevent inadvertent removal of the cap from the horn and axle.

BRIEF DESCRIPTION OF THE DRAWINGS

FIG. 2 is a front view of a caster assembly incorporating the unit of FIG. 1 and including the stem retainer (shown in section) and the wheel and axle assembly, with a portion of the horn broken away to show the axle mounting.

FIG. 3 is a side elevational view of the complete caster assembly.

FIG. 9 is a front view of a caster assembly incorporating the unit of FIG. 8 and including the stem retainer shown in section and wheel and axle assembly, with a portion of the horn, wheel and axle cap broken away to show the axle mounting details.

FIG. 10 is a side elevational view of the assembly but omitting the axle and cap.

DESCRIPTION OF THE PREFERRED EMBODIMENT

Figure 1:
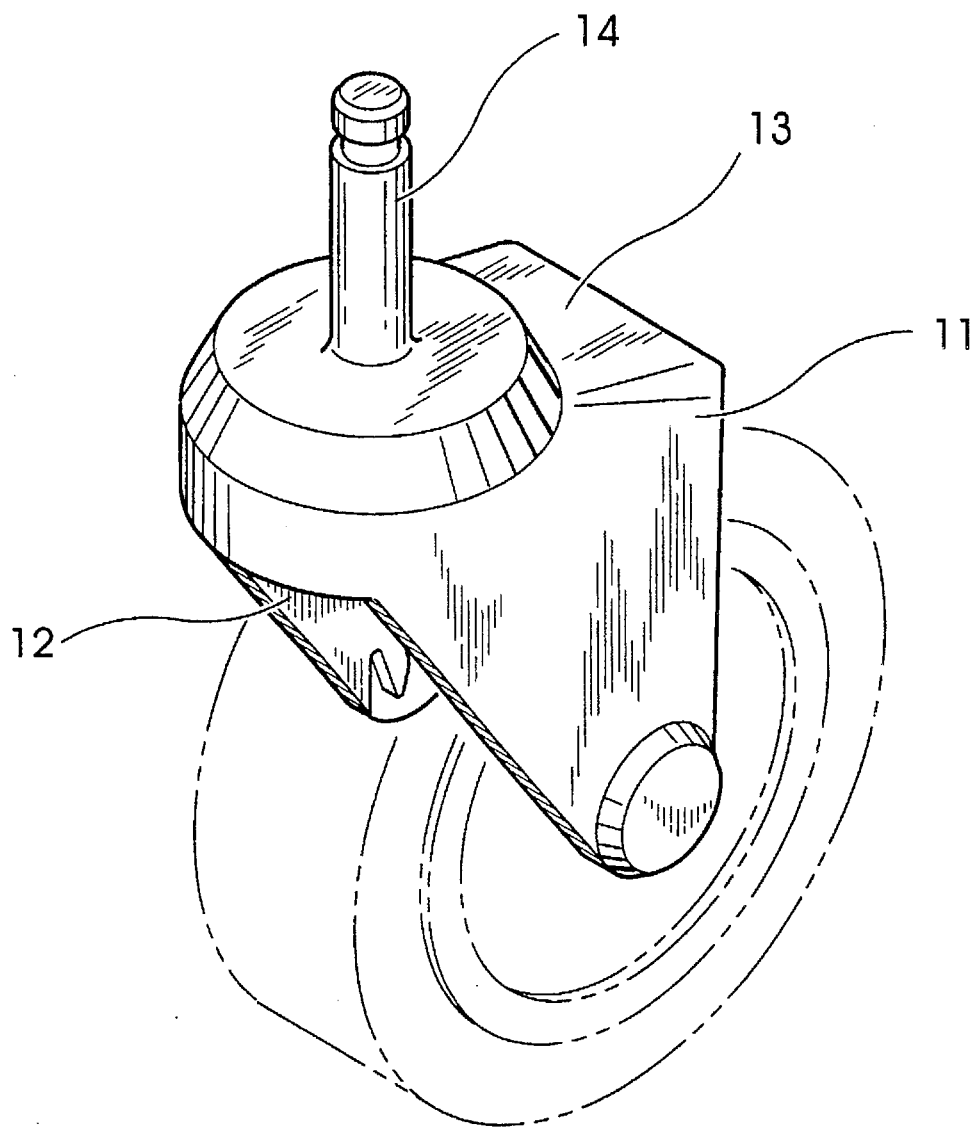
FIG. 1 is a pictorial view of the integral caster horn and stem of the caster assembly according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows a caster horn and stem combination including the horn sidewalls or legs 11 and 12 and bridging portion 13 atop the sidewalls, and stem 14 projecting upward from the bridging portion. This entire unit is one homogeneous unit of molded plastic. Type 6 nylon is an example. As shown in FIG. 2, which is an illustration of the complete caster assembly, the stem 14 is received in the tubular portion 16 of the stem retainer 17. The stem is slidingly but fittingly received in the tubular portion so that it is free to rotate therein but without wobbling. The flat upper end 18 of the stem bears against the surface of the bearing ball 19 which fits in the hemispherical closed end 21 of the stem retainer.

The stem retainer has a base 22 having a generally flat top surface 23 and a downwardly projecting peripheral skirt 24 concentric with the axis 15 of the tubular portion 16. This skirt has a conical inner face 26 which surrounds the frustoconical platform portion 27 of the caster horn bridge. Although the conical inner face of the skirt 24 and outer face 27 of the platform or plateau portion of the horn are at basically the same angle (25°) from vertical, and the top of the platform and the bottom of the retainer base are perpendicular to axis 15, it is intended that the bearing ball 19 support the stem retainer with a clearance of about 0.025 inches (.0635 cm) spacing between the top of the platform and bottom of the retainer base. Therefore, when the caster assembly is supporting a mop bucket or cart base 28 or the like (FIG. 3), the support of the stem retainer and thereby the base 28 is achieved through the bearing ball 19 engaging the upper end of the socket, while good lateral support is provided by the bearing of the stem 14 in the tube portion 16 of the stem retainer. Consequently, contact between the frustoconical surfaces and the facing flat surfaces of the stem retainer and the caster horn platform can be avoided. At the same time, however, the downwardly projecting skirt and the down and out slope of the caster horn platform minimizes the likelihood of dirt or moisture getting up inside the caster stem retainer. Therefore, that area and the bearing surfaces inside it and atop the stem can remain free to rotate, relatively immune to dirt or contamination. In order to prevent the caster stem and ball from falling out of the retainer at any time that the wheel is not supported by some supporting surface, there is an inwardly projecting circular ridge 29 received in the peripheral groove 31 in the caster stem. The chamfer at the top of the caster stem facilitates pushing the caster in past this rib which, itself, being an integral part of the plastic material of the stem retainer, does have some resilient response, but resists pulling the stem out of the retainer. In contrast, however, the axle can be more easily removed from the horn for cleaning, when desired. This aspect will be described now.

The wheel and axle assembly includes the wheel 32 which can be either a solid homogeneous unit of plastic, or a combination of a solid homogeneous plastic core 33 with an elastomeric, thermoplastic rubber or polyurethane tread 34 molded on the core. In either case, the center of the wheel 33 has a hole 37 through it received on the axle 39. The axle bears directly on the bore of the wheel and the wheel rotates freely on axis 36.

Figure 4:
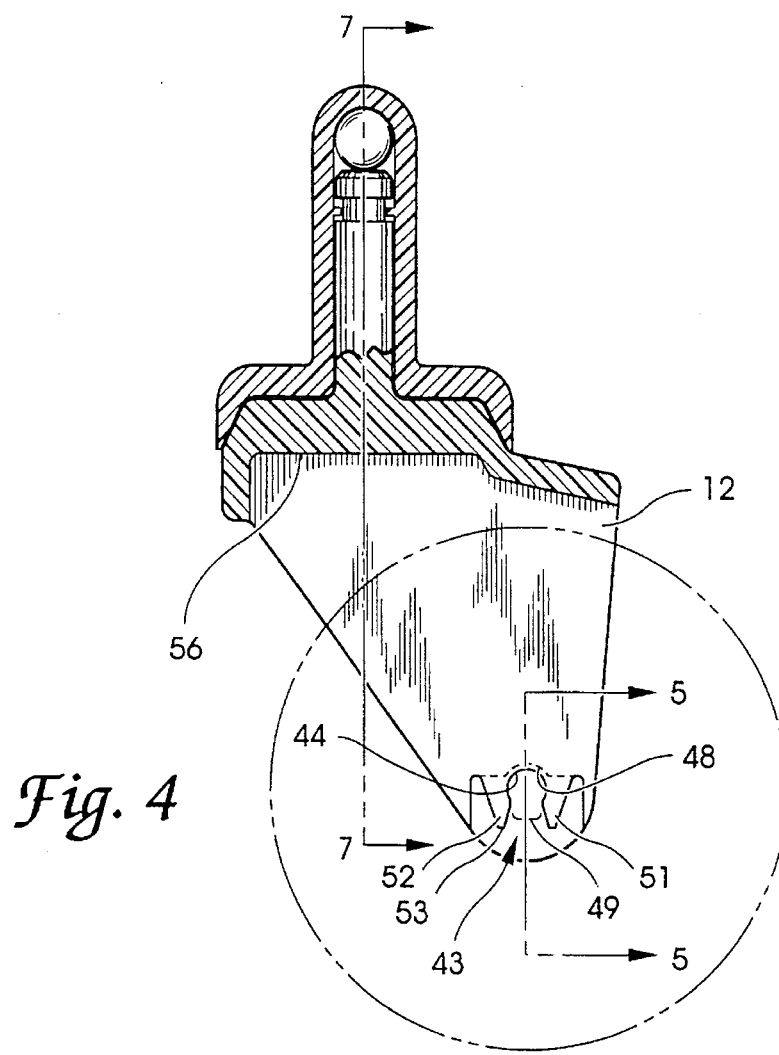
FIG. 4 is an enlarged section taken at line 4—4 in FIG. 2 and viewed in the direction of the arrows, but omitting the wheel and axle assembly.
Figure 5:
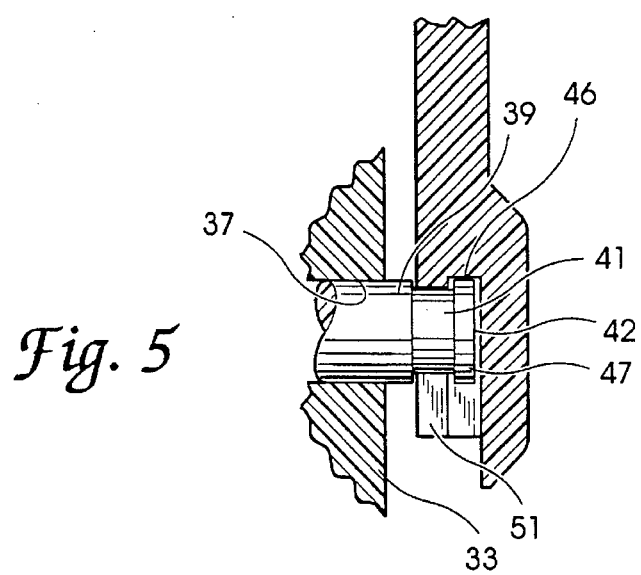
FIG. 5 is an enlarged fragmentary section taken at line 5—5 in FIG. 4 and viewed in the direction of the arrows but showing a portion of the axle in the receiver slot.

The axle has a peripheral groove 41 near each of the ends 42 of the axle. The sidewalls of the caster horn have downwardly-opening, keyhole-shaped slots 43 (FIG. 4) therein which receive the grooved portions of the axle therein, with the top 44 of the slot bearing downward on the axle portion in the groove. A recess 46 is in the horn immediately outboard of the slot 43 and in which the portion 47 of the axle outboard of the slot is received. The downwardly facing upper margin 48 of this groove or recess 46, bears on the top of portion 47 of the axle. The circular portion of the keyhole slot subtends an angle of about 270°, whereby the groove portion 41 of the axle is of a greater diameter than is the gap 49 at the entrance of the round portion of the keyhole. The result is that the space across the entrance gap to the semicircular portion of the axle slot is about 0.030 (0.0762 cm) less than the diameter of the axle. However, the entrance to the slot is tapered at about 15° on each side, with the result that there are two fingers at the front and back of each of the slots. Because the material is made of plastic, as is the axle, and the space between the facing walls of the fingers at the bottoms or lower ends 53 of the fingers is greater than the diameter of the axle groove 41, the axle can be pushed into the key-way slots and due to the resilience of the fingers 51 and 52, the groove portion 41 of the axle can pass the restricting points at the gap 49 and into the top of the slots. The axle cannot fall out of the slots but, when it is desired to pull the wheel and axle assembly out for cleaning, the resilience of the fingers 51 and 52 will enable the wheel and axle assembly to be pulled out intentionally as a unit, cleaned and then pushed back in, without damaging either the caster horn or the axle. It can be recognized that, when the axle is installed in the slots, the outer end portions of the axle, being circular flanges 47, are confined in the space between the recess groove 46 in the horn and the keyhole slotted portion of the horn at fingers 51 and 52.

Figure 6:
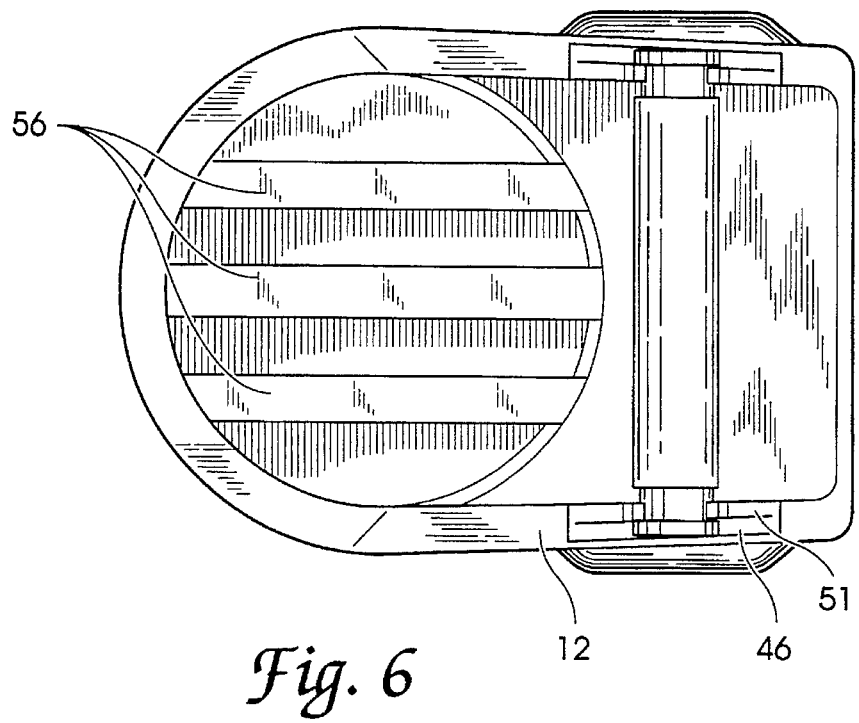
FIG. 6 is a bottom plan view on the same scale as FIG. 5 and showing the axle received in the slots.
Figure 7:
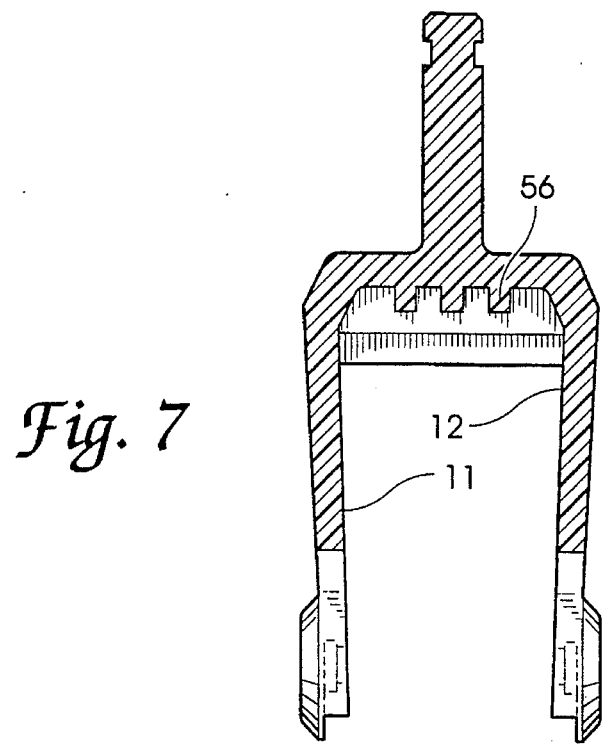
FIG. 7 is a section taken at line 7—7 in FIG. 4 and viewed in the direction of the arrows.
Figure 8:
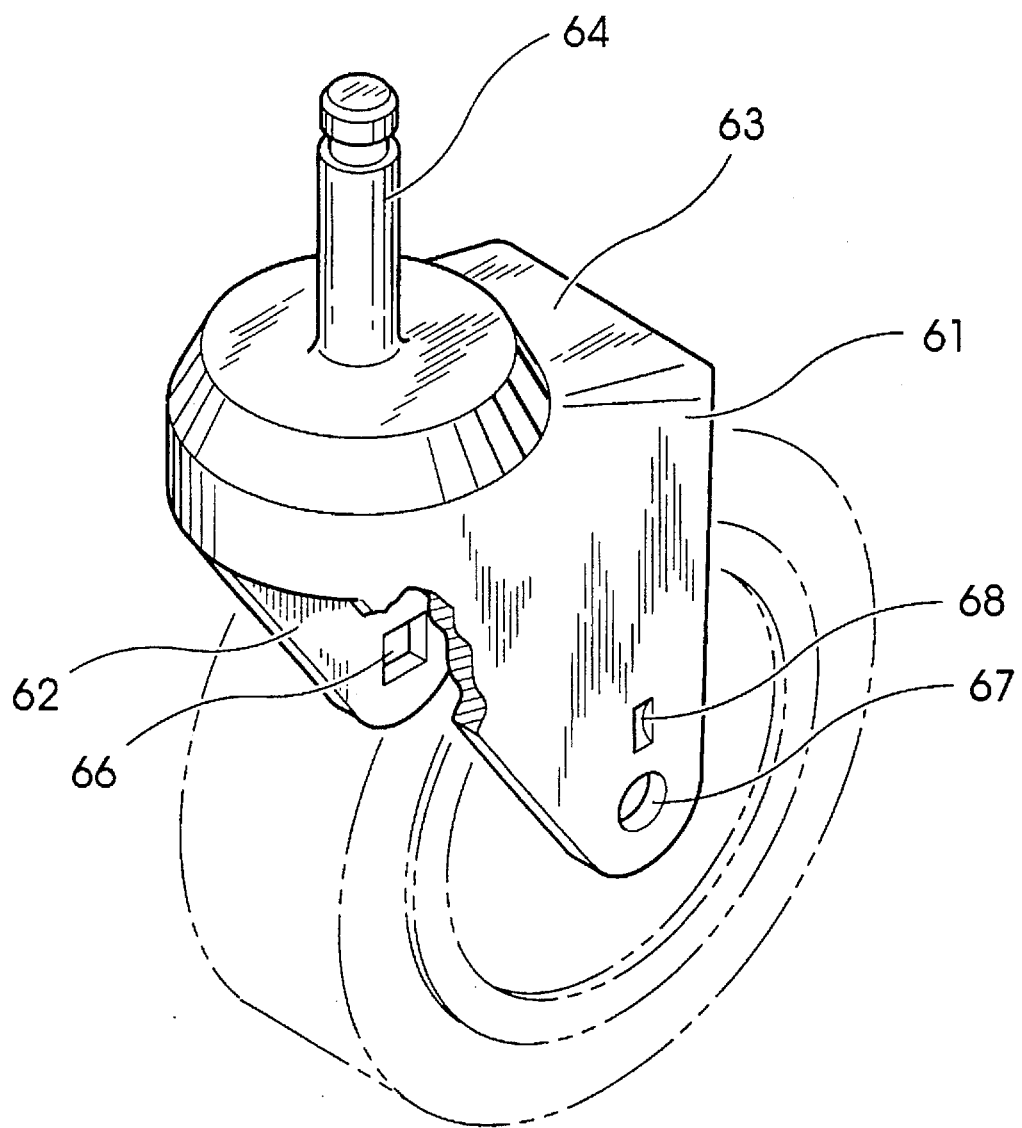
FIG. 8 is a perspective view of the integral caster stem and horn according to a second embodiment of the present invention.
Figure 12:
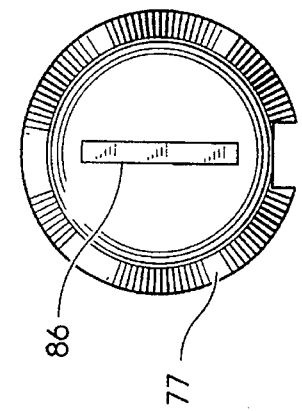
FIG. 12 is an elevational view of the convex side of the axle cap.

The inside face of the bridge portion of the horn is provided with a plurality of parallel strengthening ribs 56 as best shown in FIGS. 6 and 7. The material for the horn is preferably type 6 nylon. For the stem retainer, it is preferably a lubricated acetal copolymer. The bearing ball is so well isolated from dirt and moisture that it can be a standard 5/16 inch diameter carbon steel ball. In plastic, it can be material such as for the axle, for which the preferred material is a 50% glass-filled type 6 nylon. For the wheel itself, when made entirely of plastic, the preferred material is a high impact polypropylene. If it is made with the core and tread different, it is preferred that the core be the high impact polypropylene and that the tread be a thermoplastic rubber (TPR) or polyurethane.

Referring now to FIGS. 8–13, an alternate embodiment of the present invention is illustrated. The caster horn and stem unit is essentially the same as that in FIG. 1 except that the axle mounting features are different. In this embodiment, the horn sidewalls 61 and 62, bridge portion 63 and stem portion 64 are all one piece of molded plastic. The sidewall 62 has a square aperture 66 therethrough. Sidewall 61 has a round aperture 67 therein and a detent recess 68 above aperture 67. As shown in FIG. 10, the detent recess 68 is on line 69 centered on the axle center line 36 and directly above the aperture 67. The stem retainer pivot bearing ball and wheel are the same as in the previously described embodiment so are given the same reference numerals.

Figure 11:
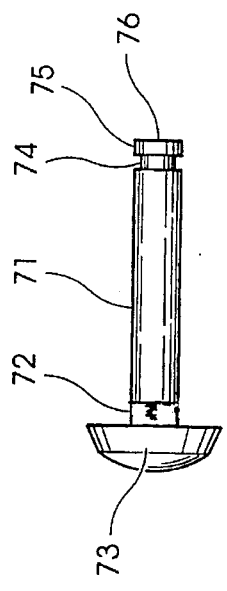
FIG. 11 shows an elevational view of the axle for this embodiment.

As shown in FIG. 11, the axle includes a round shaft 71 with a square portion 72 and button-shaped head 73 at one end. The round shaft portion 71 has a circumferential groove 74 at the opposite end 76. The square portion 72 fits the square aperture 66 in the horn sidewall 62. The round portion of the axle shaft extends entirely through aperture 67 in the other horn sidewall 61 but the groove 74 in the axle is at the outside face of the sidewall 61.

Figure 15:
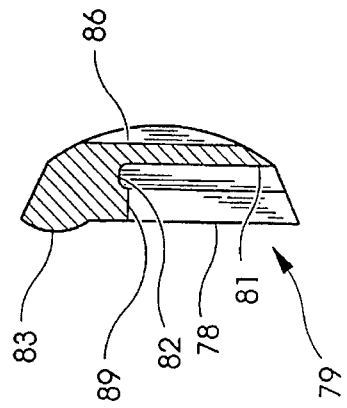
FIG. 15 is a section through the axle cap taken at line 15—15 in FIG. 14 and viewed in the direction of the arrows.
Figure 13:
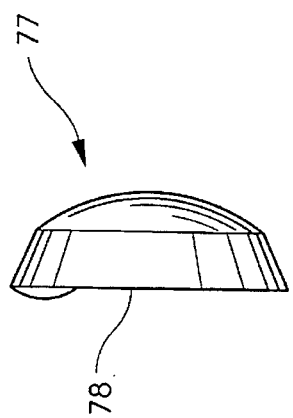
FIG. 13 is a side elevational view of the axle cap.
Figure 14:
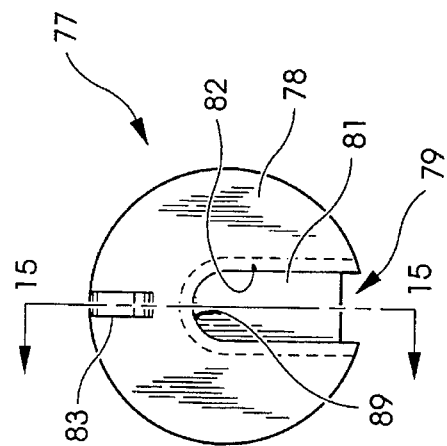
FIG. 14 is an elevational view of the back side of the axle cap.

The axle cap 77 has an outside appearance similar to that of the axle shaft head 73 and has a flat inner face 78. But as shown in FIGS. 14 and 15, the inside face has a slot 79 with an interior wall 81 and a flange cooperating with a portion of the inside wall 81 to define a groove 82 around the perimeter of the slot at the inside wall. The side portions of the slot and groove-defining flange are parallel and define a longitudinal axis of the slot 79. The inside face of the cap also has a detent boss or key 83 projecting from it. The outside of the cap has a groove 86 therein sized (0.060 inches; 1.5–1.6 mm wide for example) to receive a screwdriver or a money coin such as a dime.

For the installation of the wheel, the axle is inserted from the outside of horn sidewall 63, through the rectangular aperture 66, through the wheel and through the round aperture 67. When the inner face of the axle head 73 abuts the sidewall 62, the groove 74 in the axle will be at the outside face of the horn sidewall 61. Then the cap 77 can be installed by placing it flush against the outside face 61F of the sidewall and pushing it downward in the direction of the arrow 87 (FIG. 9) whereupon the flange portion 75 of the axle between the groove 74 and end 76 is received in the groove 82 of the axle cap. As the cap is pushed down in the direction of arrow 87, the detent boss or key 83 will approach the detent pocket or recess 68 and, when the cap is fully down so that the bottom of the axle groove 74 is engaged by the top 89 of the slot 79, so that the detent boss or key will have entered the recess 68. Since this axle cap is made of a glass filled nylon, and the caster horn is also made of plastic, there is sufficient accommodation between the parts to enable the boss 83 to slide down the outer face of the sidewall but it will snap into the recess 68. It cannot be removed therefrom without a very definite upward force intentionally applied to it to move it out of the recess. As shown best in FIG. 15, the boss 83 has a profile that is semi-cylindrical about an axis perpendicular to the plane 15—15 in FIG. 14. The curved surface provides a ramp or incline which enables intentional removal of the cap from the axle by pushing the cap in plane 15—15 along the longitudinal axis of slot 79 in a direction away from the open end of slot 79, i.e. upward in the illustrated example where recess 68 is vertically above the axle.

The coin slot 86 is provided for convenient insertion of a coin or screwdriver to assist in alignment of the detent boss 83 with the recess 68 during installation. Also, because the axle groove 74 is circular, the cap need not be inserted directly straight downward and, if inserted from an angle other khan perfectly aligned with the axis 69 in FIG. 10, it can be easily turned about the axle after the seating of the slot top 89 in the groove 74, to move the detent boss 83 in an arcuate path around to the recess 68, where it will snap into place. Since the sides of boss 83 are flat and parallel to the axis of slot 79, and so are the sides of recess 68, they will resist further turning of the cap.

The spacing between the outside surfaces of horn sidewalls 61 and 62 may be slightly greater than the spacing between the inside face of the axle head 73 and the inside face 78 of cap 77 if the cap were placed on the axle outside of the assembly. In this way, there will be a slight elastic deformation of the caster horn during installation of the cap on the axle, thus assuring that the boss 83 will snap into the recess 68 during completion of wheel and axle assembly installation, and remain in the recess with slight tension on the axle holding the cap snug against horn surface 61F.

If strings get caught or accumulate around the wheel or axle, the axle can be intentionally removed by pushing upward on the axle cap for removal of it from the axle, whereupon the axle can be pulled out and the wheel removed, cleaned, and then re-installed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a caster assembly including a stem, a horn having two legs and a bridge between the legs, a wheel and an axle supporting the horn on the wheel, each of the legs having an outside surface, the improvement characterized in that:

the axle has a retainer on one end engaged with the outside surface of one leg of the horn, the axle has a groove adjacent its other end and outside the outside surface of the other leg, an axle cap covers the other end of the axle and includes a slot receiving a portion of the other end of the axle and having a slot-defining flange received in the axle groove, and a detent boss and detent boss receiver in the cap and other leg of the horn resist removal of the cap from the other end of the axle.

2. The improvement of claim 1 and wherein:

the horn legs are resiliently engaged with the retainer and cap whereby the axle is in tension between the retainer and cap.

3. The improvement of claim 2 and wherein:

the cap has an inside face and an outside face;

the boss is on the inside face of the cap, and the receiver is on the outside surface of the other leg above the axle.

4. The improvement of claim 3 and wherein:

the boss is a projection; and the receiver is a recess.

5. The improvement of claim 4 and wherein:

the cap slot defining flange has side portions which are parallel to each other and define a longitudinal axis of the cap slot:

the boss has a surface curved about an axis perpendicular to a plane that contains the longitudinal axis of the cap slot and that contains the axis of the axle.

6. The improvement of claim 5 and wherein:

the boss has sides that are generally flat and parallel to the longitudinal axis of the cap slot.

7. The improvement of claim 1 and wherein:

the cap has an inside face, and the cap slot is on the inside face of the cap and extends from one marginal edge of the cap toward an opposite edge of the cap and has a stop surface;

the slot has facing flange portions along the sides and received in the axle groove and retaining the cap on the axle and retaining the axle in the other leg of the horn.

8. The improvement of claim 7 and wherein:

the detent boss is between the stop surface and the opposite edge of the cap.

9. The improvement of claim 7 and wherein:

the axle retainer is a head integral with the axle, and the stem, horn, axle and cap are made of plastic.

10. The improvement of claim 7 and wherein:
the cap has a tool receiver on the outside of the cap.

11. The improvement of claim 10 and wherein:
the tool receiver is a groove sized to receive a money coin.

12. For the caster assembly of claim 1, a method of removal of the wheel and axle from the horn and comprising the steps of:
  pushing the cap along the surface of the other leg of the horn in a direction effective to terminate resistance of the detent; and
  removing the axle from the horn sufficiently to remove the wheel from the axle.

13. For the caster assembly of claim 7, a method of removal of the wheel and axle from the horn and comprising the steps of:
  pushing the cap along the surface of the other leg of the horn in a direction parallel to the facing flange portions and thereby dislodging the boss from the boss receiver and removing the cap from the axle; and
  removing the axle from the horn sufficiently remove the wheel from the axle.

14. A caster assembly comprising:
  a wheel;
  a horn made of plastic and including spaced side walls and a bridge across the walls;
  an axle holding the wheel in the horn between the side walls;
  a stem fixed in relation to the horn and projecting from the bridge in a direction away from the wheel; and
  a stem retainer made of plastic and slidably, but rotatably, receiving the caster stem therein;
  the outer end of the stem bearing a load through an inner surface of the retainer and rotatably supporting the retainer on the stem.

15. The assembly of claim 14 and wherein:
there is a plastic bearing between the outer end of the stem and a top of the retainer.

16. The assembly of claim 14 and wherein the stem retainer includes:
  a base; and
  a tubular portion projecting upward from the base to an upper end,
  the upper end of the tubular portion being closed and having said inner surface thereon.

17. The assembly of claim 14 and further comprising:
  a bearing ball;
  the inner surface of the retainer being concave;
  the bearing ball being located between and engaging the outer end of the stem and the concave inner surface and transmitting the load from the retainer to the stem.

18. The assembly of claim 17 and wherein:
the ball is made of plastic.

19. The assembly of claim 17 and wherein:
the inner surface is hemispherical.

20. The assembly of claim 14 and wherein:
the base includes a flat top portion and an outer flange portion extending axially from the top portion in a direction opposite the tubular portion and forming a skirt; and
the bridge has a platform received in the skirt.

21. The assembly of claim 20 and wherein:
there is 0.063 cm. clearance between the skirt and the platform.

22. A caster assembly comprising:
  a wheel;
  a horn including spaced side walls on opposite sides of the wheel and a bridge across the walls, one of the walls having a detent feature thereon;
  an axle holding the wheel in the horn between the side walls, the axle having a retainer at one end and a groove and a flange at the opposite end;
  a stem projecting from the bridge in a direction away from the wheel, the stem being integral with the walls and the bridge; and
  an axle cap having an outer surface and an inner surface and a slot on the inner surface, the slot having a flange with a portion received in the axle groove and retaining the axle in the horn,
  the cap also having a detent feature thereon cooperating with the detent feature on the horn wall to inhibit removal of the cap from the axle.

23. The assembly of claim 22 and wherein:
the axle and cap are made of plastic.

24. The assembly of claim 22 and wherein:
the detent feature of the horn wall is a recess; and
the detent feature of the cap is a boss,
the boss being received in the recess sufficiently to inhibit removal of the cap.

25. The assembly of claim 24 and wherein:
the cap slot has an open end and a closed end and the cap slot flange has edges facing and extending parallel to each other and extending toward the closed end of the slot;
the boss has a parallel sides that are parallel to the direction from the open end to the closed end of the slot, and
the boss has a profile having a surface that is inclined with respect to the inner surface of the cap.

26. For the caster assembly of claim 22, a method of removal of the wheel and axle from the horn and comprising the steps of:
  pushing the cap along the surface of the one wall of the horn in a direction effective to terminate cooperation of the detent features; and
  removing the axle from the horn sufficiently to remove the wheel from the axle.

27. For the caster assembly of claim 24, a method of removal of the wheel and axle from the horn and comprising the steps of:
  pushing the cap along the surface of the one wall of the horn in a direction parallel to the flange edges and thereby dislodging the boss from the recess and removing the cap from the axle; and
  removing the axle from the horn sufficiently to remove the wheel from the axle.

* * * * *